(12) United States Patent
Suzuki et al.

(10) Patent No.: US 8,305,020 B2
(45) Date of Patent: Nov. 6, 2012

(54) ELECTRIC POWER CONVERSION DEVICE, COMPRESSOR MOTOR WITH THE DEVICE, AND AIR CONDITIONER WITH THE MOTOR

(75) Inventors: Takahiro Suzuki, Tokai (JP); Yasuo Notohara, Hitachiota (JP); Kiyoshi Sakamoto, Hitachinaka (JP)

(73) Assignees: Hitachi, Ltd., Tokyo (JP); Hitachi Industrial Equipment Systems Co., Ltd., Tokyo (JP)

( * ) Notice: Subject to any disclaimer, the term of this patent is extended or adjusted under 35 U.S.C. 154(b) by 780 days.

(21) Appl. No.: 12/388,762

(22) Filed: Feb. 19, 2009

(65) Prior Publication Data

US 2009/0323232 A1    Dec. 31, 2009

(30) Foreign Application Priority Data

Jun. 27, 2008  (JP) ................. 2008-168039

(51) Int. Cl.
*H02H 7/08* (2006.01)
(52) U.S. Cl. .............. 318/400.21; 318/400.27; 318/722; 318/254.1
(58) Field of Classification Search ............ 318/400.21, 318/400.22, 400.26, 400.27, 722, 723, 724, 318/254.1, 434; 361/1, 2, 8, 22, 23, 31
See application file for complete search history.

(56) References Cited

U.S. PATENT DOCUMENTS

| | | | |
|---|---|---|---|
| 4,456,865 A * | 6/1984 | Robertson et al. | 318/599 |
| 4,602,201 A * | 7/1986 | Edwards | 318/811 |
| 4,607,205 A * | 8/1986 | Kito et al. | 318/778 |
| 5,569,995 A | 10/1996 | Kusaka et al. | |
| 5,694,010 A * | 12/1997 | Oomura et al. | 318/400.07 |
| 6,153,993 A * | 11/2000 | Oomura et al. | 318/434 |
| 6,735,537 B2 * | 5/2004 | Liu et al. | 702/64 |
| 7,221,121 B2 * | 5/2007 | Skaug et al. | 318/807 |
| 7,609,498 B2 * | 10/2009 | Iimura et al. | 361/93.7 |
| 7,759,888 B2 | 7/2010 | Matsui et al. | |
| 7,773,351 B2 * | 8/2010 | Kanai | 361/23 |
| 2007/0241720 A1 * | 10/2007 | Sakamoto et al. | 318/811 |

FOREIGN PATENT DOCUMENTS

| | | |
|---|---|---|
| JP | 06-205599 | 7/1994 |
| JP | 10-145960 | 5/1998 |
| JP | 11-018436 | 1/1999 |
| JP | 11-332002 | 11/1999 |
| JP | 3146791 | 1/2001 |
| JP | 2001-305175 | 10/2001 |
| JP | 2001-327173 | 11/2001 |
| JP | 2001-352790 | 12/2001 |
| JP | 2005-254785 | 12/2005 |
| JP | 3801471 | 5/2006 |
| JP | 2007-143244 | 6/2007 |
| WO | WO 2006/112033 | 10/2006 |

* cited by examiner

*Primary Examiner* — Walter Benson
*Assistant Examiner* — Thai Dinh
(74) *Attorney, Agent, or Firm* — Antonelli, Terry, Stout & Kraus, LLP.

(57) ABSTRACT

The device is provided with an electric power conversion circuit including switching elements for converting a DC electric power to an AC electric power, a load connected to an output side of the electric power conversion circuit, means for detecting a current flowing through a DC side in the electric power conversion circuit, a voltage command value preparing means for controlling the operation of the switching elements in the electric power conversion circuit and a wire breaking detecting means. The wire breaking detection means judges a wire breaking in the load or an abnormality of any of the switching elements in the electric power conversion circuit by making use of a DC current detection value in a period when a current of maximum voltage phase or of voltage minimum phase of the electric power conversion circuit is flowing in a DC current.

13 Claims, 12 Drawing Sheets

ELECTRIC POWER CONVERSION DEVICE, COMPRESSOR MOTOR WITH THE DEVICE, AND AIR CONDITIONER WITH THE MOTOR

CLAIM OF PRIORITY

The present application claims priority from Japanese patent application serial no. 2008-168039, filed on Jun. 27, 2008, the content of which is hereby incorporated by reference into this application.

FIELD OF THE INVENTION

The present invention relates to an electric power conversion device having an electric power conversion circuit that is controlled by pulse width modulation signals (PWM signals) and in particular concerns to an effective technology applicable to a wire breaking detection in a load connected to an output side of an electric power conversion circuit.

BACKGROUND ART

As methods of detecting wire breaking, variety methods thereof have been proposed hitherto, for example, such as a method of performing a wire breaking detection by detecting a phase current in a load (motor) and a method of performing a wire breaking detection while providing an operating state used for the wire breaking detection prior to starting a motor.

As the above method of detecting the motor phase current, patent JP-A-2001-305175 discloses a method of performing a wire breaking detection based on a ripple variation amount in a phase current. Further, as the method of providing the operating state used for the wire breaking detection prior to starting the motor, JP-A-2007-143244 discloses a method of performing a wire breaking detection by detecting a current flowing through a DC side in an electric power conversion circuit while applying a DC voltage thereto prior to starting the same. Still further, JP-B-3801471 discloses a method of performing a wire breaking detection only under a certain condition (when an angular velocity of a motor is above a predetermined value and a current command value of the motor is above a predetermined value).

An example of the above method of detecting the motor phase current will be explained with reference to FIGS. 16 and 17. FIG. 16 shows a schematic constitutional diagram of a motor drive device and FIG. 17 shows current variations (ripples) at a normal condition and at a wire breaking condition. In the present example, as the motor a DC motor 90 with brushes (a positive pole brush 95a and a negative pole brush 95b) and a commutator is exemplified. FIG. 17(a) shows a current variation (ripple) in a normal instance. In the drawing, an amount of current variation (difference between the maximum value and the minimum value) gives I-1. On the other hand, FIG. 17(b) shows a current variation at an instance when a motor winding in a certain phase is wire broken. In the drawing, the amount of current variation gives I-2, which is larger in comparison with that at the normal condition (FIG. 17(a)). A control circuit 94 can detect a wire breaking in the motor windings by comparing an amount of current variation detected by a current sensor 93 with a judgment reference value stored in advance.

However, with this method it is indispensable to set the judgment reference value at a proper value. For this reason it is necessary to alter the judgment reference value depending on such as size of the load and ambient temperature. Namely, it is difficult to apply the method to a usage where the load condition greatly changes. Further, since the judgment is performed based on the amount of current variation, the method cannot be applied in association with current detection accuracy under a condition when a certain amount of current is flowing. Still further, the method cannot judge which phase in the motor windings is wire broken.

Now, an example of the method of providing the operating condition used for the wire breaking detection prior to starting the motor will be explained with reference to FIG. 18. In the present example, the wire breaking detection is performed by detecting a current flowing through a shunt resistor 97 disposed at a DC side of an electric power converter circuit 98 at a moment when a DC voltage 99 is applied to a motor 96 prior to starting the motor 96. In order to apply the DC voltage 99 to the motor 96, for example, as shown in FIG. 18(a), an upper switching element (U+) in U phase and lower switching elements (V- and W-) in V phase and W phase are turned on and the other switching elements are turned off. At this moment, a current flows in the electric power conversion circuit 98 and the motor 96 through a route indicated by arrows in the drawing. Herein, when a motor winding in U phase is wire broken, no current flows through the shunt resistor 97. Accordingly, the wire breaking detection is performed by detecting a current flowing through the shunt resistor 97. However, if a wire either in V phase or in W phase is broken, since a current flows through a route in the other phase, in this instance the wire breaking detection with this current route fails. Therefore, it is necessary to detect successively the current flowing through the shunt resistor 97 while changing the switching state of the respective phases (for example, as such as in FIG. 18(b) and FIG. 18(c)).

In the present example, since the current detection during the time when the DC voltage is applied is preconditioned, the wire breaking detection can only be performed prior to starting the motor. In other words, the wire breaking detection cannot be performed during the operation of the motor. For this reason, in an application where a motor is once started the motor is continuously driven long time, it takes time until a wire breaking detection is performed. Further, since the wire breaking detection has to be performed by successively changing the switching state, it is difficult to apply the method to an application that requires, for example, to start a motor in a short time.

As has been explained above, problems of the conventional methods of detecting the motor phase current and of providing the operating state used for the wire breaking detection prior to starting are such as necessity of the current flowing of a certain amount, the limited application conditions and the incapability of wire breaking detection during operation. Further, the technology disclosed in patent document 3, is for a method of detecting wire breaking only under a certain condition, therefore, the wire breaking detection therewith cannot be performed without regarding operating conditions.

SUMMARY OF THE INVENTION

Accordingly, an object of the present invention is to resolve these tasks and to provide an electric power conversion device that surely permits a wire breaking detection regardless to such as amount of current command value and operating conditions as well as during the operation.

The above and the other objects and novel features of the present invention will become apparent from the description below and the attached drawings.

A present invention comprising an electric power conversion circuit including switching elements for converting a DC electric power to an AC electric power, a load connected to an output side of the electric power conversion circuit, a DC current detecting means for detecting a current flowing through a DC side in the electric power conversion circuit, a control circuit for controlling the switching elements in the electric power conversion circuit, is characterized in that further comprising a wire breaking detecting means that judges a wire breaking in the load or an abnormality of any of the switching elements in the electric power conversion circuit by making use of a value of DC current detected by the DC current detecting means in a period when a current of voltage maximum phase or of voltage minimum phase of the electric power conversion circuit is flowing in a DC current.

Other aspect of the present invention is characterized in that the wire breaking detecting means judges a wire breaking in the load or an abnormality of any of the switching elements in the electric power conversion circuit by making use of an integration value of the DC current detection value. Still further, the present invention is characterized by further comprising abnormality informing means for informing outside when the wire breaking detecting means judges a wire breaking in the load or an abnormality of any of the switching elements in the electric power conversion circuit.

Further other aspect of the present invention may be characterized by further comprising a stopping control means for stopping applying a voltage to a motor load being driven or a decelerating and stopping control means for stopping the motor after deceleration when a wire breaking in the load or an abnormality of any of the switching elements in the electric power conversion circuit is judged. Still further, the electric power conversion device according to the present invention is characterized by being accommodated into a single package.

A present invention comprising an electric power conversion circuit including switching elements for converting a DC electric power to an AC electric power, a load connected to an output side of the electric power conversion circuit, a DC current detecting means for detecting a current flowing through a DC side in the electric power conversion circuit, a control circuit for controlling the switching elements in the electric power conversion circuit, may be characterized in that the control circuit includes a voltage command value preparing means for outputting a voltage command value, the voltage command value preparation means alters the voltage command value in an integral multiple cycle of ½ of a cycle for controlling the switching elements in the electric power conversion circuit, and characterized by further comprising a wire breaking detecting means that judges a wire breaking in the load or an abnormality of any of the switching elements in the electric power conversion circuit by making use of a value of DC current detected by the DC current detecting means, at the time when the voltage command value preparing means alters the voltage command value, in a period when a current of voltage maximum phase or of voltage minimum phase of the electric power conversion circuit is flowing in a DC current.

Other aspect of the present invention may be characterized in that the voltage command value preparing means alters a d axis current command value when preparing the voltage command value, the wire breaking detecting means judges a wire breaking in the load or an abnormality of any of the switching elements in the electric power conversion circuit by making use of a value of DC current detected by the DC current detecting means, at the time when the voltage command value preparing means alters the d axis current command value, in a period when a current of voltage maximum phase or of voltage minimum phase of the electric power conversion circuit is flowing in a DC current, and further, the wire breaking detecting means judges a wire breaking in the load or an abnormality of any of the switching elements in the electric power conversion circuit by making use of a difference of the values of DC current detected by the DC current detecting means before and after the voltage command value being altered by the voltage command value preparing means in a period when a current of voltage maximum phase or of voltage minimum phase of the electric power conversion circuit is flowing in a DC current.

Further aspect of the present invention characterized in that the wire breaking detecting means judges a wire breaking in the load or an abnormality of any of the switching elements in the electric power conversion circuit by making use of an integration value of the values of DC current detected by the DC current detecting means in a period when a current of voltage maximum phase or of voltage minimum phase of the electric power conversion circuit is flowing in the DC current.

Further, a present invention may be characterized by using for a compressor motor an electric power conversion device comprising an electric power conversion circuit including switching elements for converting a DC electric power to an AC electric power, a load connected to an output side of the electric power conversion circuit, a DC current detecting means for detecting a current flowing through a DC side in the electric power conversion circuit, a control circuit for controlling the switching elements in the electric power conversion circuit, and further comprising a wire breaking detecting means that judges a wire breaking in the load or an abnormality of any of the switching elements in the electric power conversion circuit by making use of a value of DC current detected by the DC current detecting means in a period when a current of voltage maximum phase or of voltage minimum phase of the electric power conversion circuit is flowing in a DC current.

Other aspect of the present invention is characterized by using the above electric power conversion device and the compressor for an air conditioner.

ADVANTAGE OF THE INVENTION

An advantage obtained by the present invention is that the wire breaking detection can be surely performed regardless to such as an amount of current command value and operating conditions of the electric power conversion device as well as during the operation thereof.

Further, according to the present invention, since the wire breaking detection can be performed by the electric power conversion device itself without relying on a superior system, a further safe electric power conversion device can be realized.

BEST MODES FOR CARRYING OUT THE INVENTION

Figure 1:
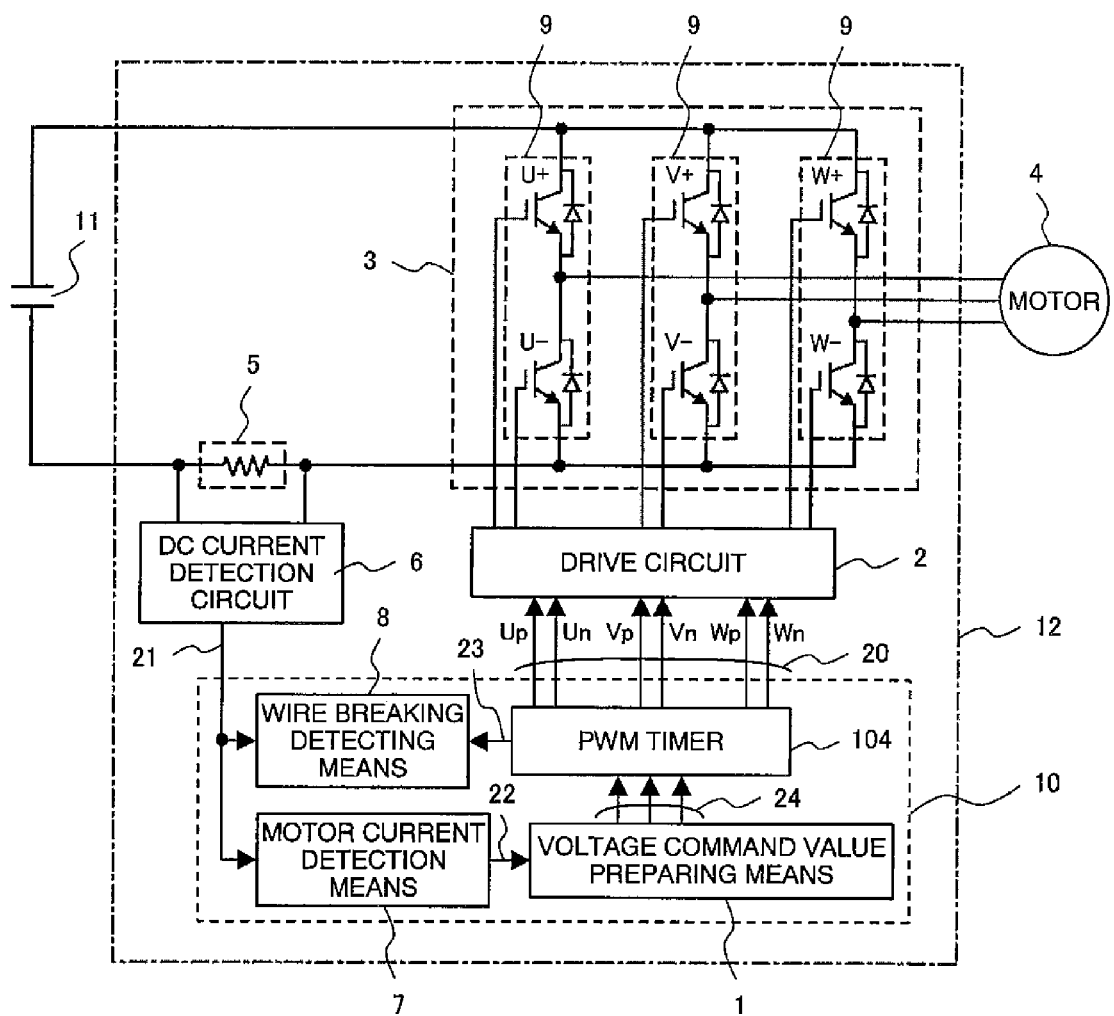
FIG. 1 is a general constitutional diagram showing a motor drive device in embodiment 1 of the present invention.

A present invention comprises an electric power conversion circuit including not less than two switching elements for converting a DC electric power to an AC electric power, a load connected to an output side of the electric power conversion circuit, means for detecting a DC current flowing through a DC side in the electric power conversion circuit, a control circuit for controlling the switching elements in the electric power conversion circuit and a wire breaking detecting means, wherein the wire breaking detecting means judges a wire breaking in the load (including a wire breaking of a connection between the electric power conversion circuit and the load) or an abnormality of any of the switching elements in the electric power conversion circuit by making use of a DC current detection value in a period when a current of voltage maximum phase or of voltage minimum phase of the electric power conversion circuit is flowing in a DC current.

As an alternative of the DC current detection value used for judging such as a wire breaking in the load and an abnormality of any of the switching elements, an integrated value of the DC current detection values can be used.

A voltage command value preparation means in the control circuit alters the voltage command value in an integral multiple cycle of ½ of a cycle for controlling the switching elements in the electric power conversion circuit. Methods of altering the voltage command value include a method of altering d axis current command value in a certain period, a method of adding and subtracting a predetermined value to and from the voltage command value in a period between a crest and a trough in a saw tooth wave serving as PWM carrier signals (a half cycle of PWM carrier cycle) and a method of adding and subtracting a predetermined value to and from the voltage command value in an integral multiple cycle of a half cycle of a PWM carrier cycle. The wire breaking detecting means judges a wire breaking by making use of a difference of the DC current detection values before and after the alternation of the voltage command value or the integration value of the DC current detection values when the voltage command value is altered.

When a wire breaking or an abnormality of any of the switching elements is judged, applying a voltage to a motor is immediately stopped by a stop control means or applying the voltage is stopped by a deceleration and stop control means after a deceleration.

As has been explained above, the wire breaking detection is realized by making use of the DC current detection value in a period when a current of voltage maximum phase or of voltage minimum phase of the electric power conversion circuit is flowing in the DC current while adjusting the voltage command value applied to the load. Thereby, a wire breaking detection can be performed regardless to such as an amount of current command value and operating conditions of the electric power conversion circuit as well as during the operation thereof.

Herein below, embodiments of the present invention will be explained in detail with reference to the drawings. In addition, in all of the drawings for explaining the embodiments, same elements are generally denoted by same reference numerals and repetitive explanation thereof is omitted.

Embodiment 1

The present embodiment will be explained while using a motor as the load.

At first, embodiment 1 of an electric power conversion device according to the present invention will be explained. In FIG. 1, a general constitutional diagram of a motor drive device serving as the electric power conversion device is shown. The motor drive device (electric power conversion device) 12 is configured by an inverter circuit (electric power conversion circuit) 3 constituted by switching elements 9, a shunt resistor 5, a voltage command value preparing means 1, a PWM pulse generating unit 104, a DC current detecting circuit 6, a motor current detecting means 7, a wire breaking detecting means 8 and a drive circuit 2. Further, the voltage command value preparing means 7, the PWM pulse generating unit 104, the motor current detecting means 7 and the wire breaking detecting means 8 can be accommodated in a single control circuit 10 by such as a microcomputer and a DSP (Digital Signal Processor).

Figure 2:
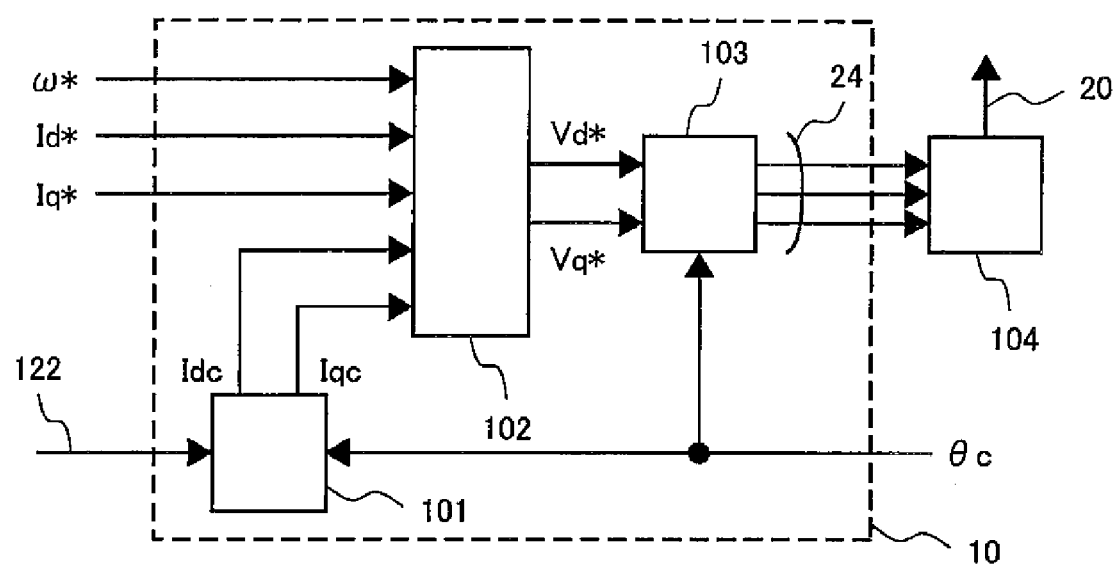
FIG. 2 is a constitutional diagram showing a voltage command value preparing means in embodiment 1 of the present invention.

The voltage command value preparing means 1 prepares 3 phase voltage command values 24 based on such as a value of a motor current detected by the motor current detecting means 7, which will be explained later, and motor constants. A motor is, for example, a permanent magnet motor of which rotor is configured by a permanent magnet and a plurality of windings are disposed for forming an alternating magnetic field around the rotor. When driving the permanent magnet motor, the voltage command value preparing means 1 is configured, for example, as shown in FIG. 2, by a 3Φ/dq conversion unit 101 which performs a coordinate conversion of motor current detection values 122 in 3 phase AC axis to dq axis currents through dq conversion, a voltage command value preparing unit 102 which computes d axis and q axis voltage command values by making use of d axis and q axis current command values (Id* and Iq*), d axis and q axis current detection values (Idc and Iqc) and an angular frequency command value ω* of an AC voltage output from the inverter circuit 3 and a dq/3Φ coordinate conversion unit 103 which performs a coordinate conversion of the dq axis values to 3 phase AC axis values. In addition, a position in the magnetic flux direction of the rotor magnet is defined as d axis and a position advanced by 90° in electrical degree in the rotating direction as q axis.

As a phase θc to be used for the 3Φ/dq conversion unit 101 and the dq/3Φ coordinate conversion unit 103, a value detected by a positional sensor attached to the rotor or a value of the rotor position estimated from such the voltage command value and the current detection value can be used.

In the voltage command value preparation unit 102, a vector computation, for example, such as equations (1) and (2) is performed and voltage command values for dq axes (Vd* and Vq*) are obtained.

$$Vd^* = R \times Id^* - \omega^* \times Lq \times Iq^* \qquad \text{equation (1)}$$

$$Vq^* = R \times Iq^* + \omega^* \times Ld \times Ld^* + \omega^* \times Ke \qquad \text{equation (2)}$$

Herein, R is a resistance value of the motor winding, Ld is an inductance in d axis, Lq is an inductance in q axis and Ke is an induced voltage constant. Further, when driving a permanent magnet motor, the d axis current command value Id* is frequently given of 0.

In the voltage command value preparation unit 102, the dq axis current command values (Id*, Iq*) or the dq axis voltage command values (Vd*, Vq*) can be altered by making use of the dq axis current detection values (Idc, Iqc) so as to make follow the current flowing through the motor to the current command value.

In the PWM pulse generation unit 104, the 3 phase voltage command values are compared with a saw tooth wave to obtain PWM signals 20 (corresponding to Up, Un, Vp, Vn, Wp, Wn in FIG. 1) for controlling the respective switching elements 9.

The drive circuit 2 outputs a drive signal for driving the switching elements 9 based on the PWM signals 20. A DC voltage of a DC voltage source 11 is applied to the inverter circuit 3 and the respective switching elements 9 therein are turned on and off in response to the drive signal output from the drive circuit 2 and 3 phase AC voltages are applied to the motor 4. At the DC side of the inverter circuit 3 a shunt resistor 5 is connected. The shunt resistor 5 is frequently provided to detect an over current flowing through the inverter circuit 3 and to protect the switching elements 9. In the present embodiment, the shunt resistor 5 is used not only to protect the switching elements 9 but also to detect such as a motor current and to detect a wire breaking of the motor 4 or an abnormality of the inverter circuit 3. For this reason the method of detecting a wire breaking by making use of the shunt resistor 5 which is originally required for protecting the switching elements 9 is greatly advantageous for reducing the number of parts and reducing a semiconductor substrate area.

The DC current detection circuit 6 amplifies a voltage between both ends of the shunt resistor 5 and outputs a DC current detection value 21 to the control circuit 10. The DC current detection circuit 6 is configured, for example, such as by an OP amplifier and amplifies the same to a voltage suitable for inputting to the control circuit 10. When the control circuit 10 is a microcomputer, the voltage is amplified, for example, to a voltage having maximum voltage of 5 V and the amplified DC current is converted to a digital signal through an A/D converter (not shown) in the motor current detecting means 7.

Figure 3:
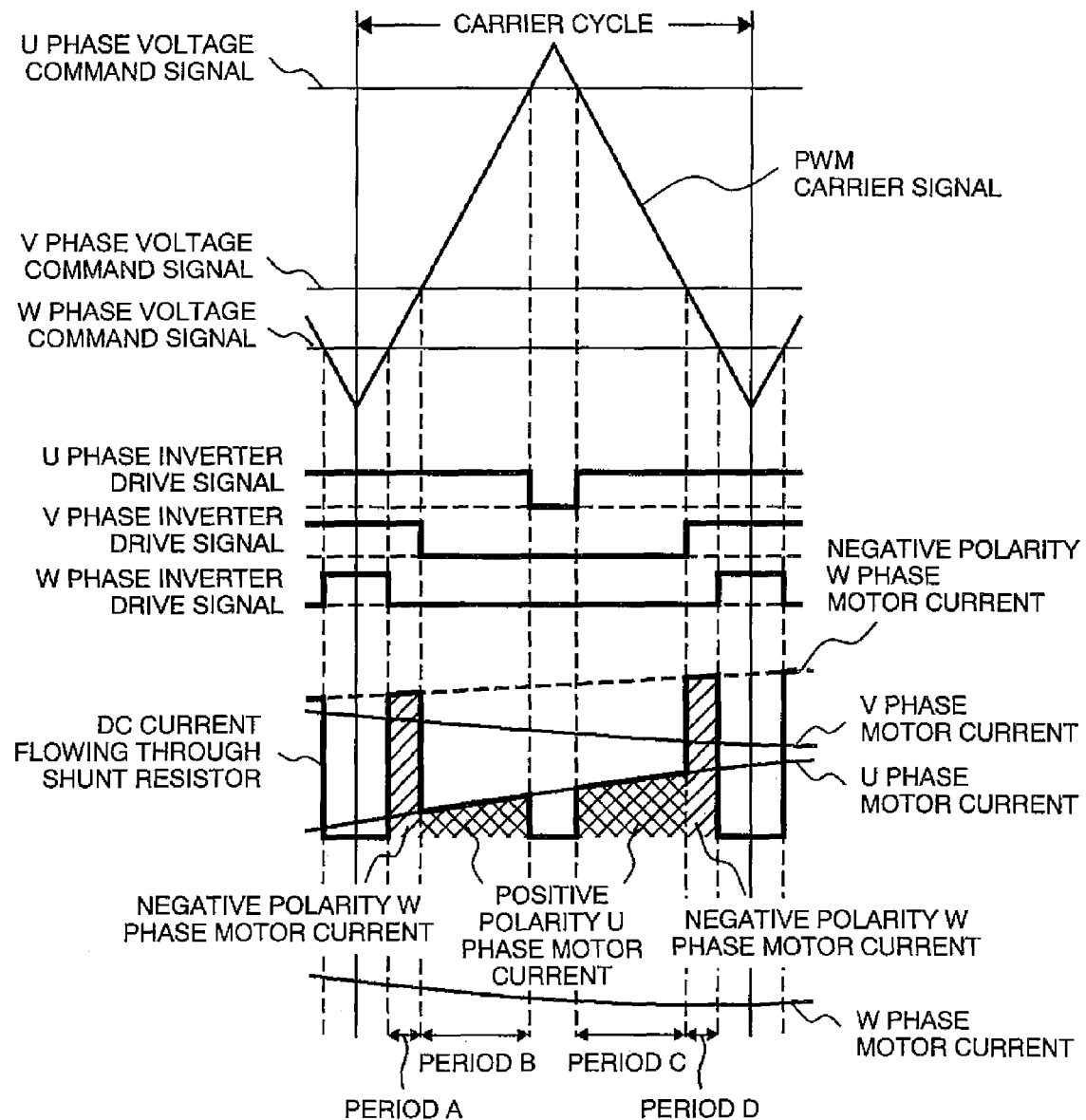
FIG. 3 is a waveform diagram for explaining a method of detecting a motor current from a DC current in embodiment 1 of the present invention.

Now, a method of detecting a motor current in the motor current detecting means 7 will be explained with reference to FIG. 3. FIG. 3 shows a relationship between a PWM carrier signal, voltage command values of respective phases prepared inside the voltage command value preparing means 1, inverter drive signals (corresponding to the PWM signals 20 in FIG. 1) of respective phases showing an operation of switching elements 9 in the respective phases and a DC current flowing through the shunt resistor 5. In the drawing, it is indicated as the inverter drive signal of High level turns on an upper arm switching element and that of Low level turns on a lower arm switching element.

As seen from FIG. 3, only the lower arm switching element in W phase is turned on and in periods A and D in which the upper arm switching elements in U and V phases are turned on, a W phase motor current in negative polarity can be observed. Further, the lower arm switching elements in V and W phases are turned on and in periods B and C in which only the upper arm switching element in U phase is turned on, a U phase motor current in positive polarity can be observed. As such, since the respective motor currents can be observed in the respective periods, the motor currents in 3 phases can be reproduced by detecting and combining these motor currents. The reproduced motor current 22 is used for preparing such as the voltage command value. Incidentally, FIG. 3 shows an instance where the inductance of the motor 4 is large and a ripple current due to switching in the inverter circuit 3 is omitted.

As will be apparent from the above, when detecting motor currents in respective phases from the DC current flowing through the shunt resistor 5, in the wire breaking detecting means 8, an absolute value of a DC current value in a period (periods A, B, C, D in FIG. 3) when a current of voltage maximum phase or of voltage minimum phase of the electric power conversion circuit is flowing through the DC current is compared with a judgment value set in advance, and when the absolute value of the current detection value is smaller than the judgment value, a wire breaking (including a wire breaking of the connection between the electric converting circuit and the load) of a motor winding of the concerned phase or an abnormality of any of the switching elements 9 can be detected.

Further, when an immediate wire breaking detection is not required, the following method of detection with the wire breaking detecting means 8 is also effective. Namely, absolute values of DC current values detected in a period when a current of voltage maximum phase or of voltage minimum phase of the electric power conversion circuit is flowing in the DC current are integrated for a predetermined period. In other words, when the wire breaking detecting means 8 is a continuous time system, the integration implies to determine the area in the period indicated by hatching or by grid pattern in FIG. 3 and when the wire breaking detecting means 8 is a discrete time system, the integration is performed by integrating the absolute values of DC current values detected in a period when a current of voltage maximum phase or of voltage minimum phase of the electric power conversion circuit is flowing in the DC current. Further, the integration of the absolute values can be performed either by continuously integrating for a predetermined period or by integrating in a plurality of times and for a predetermined period in every respective time. Subsequently, the integrated DC current value is compared with a judgment value set in advance and when the DC current integration value is smaller than the judgment value, a wire breaking of a motor winding of the concerned phase or an abnormality of any of the switching elements 9 can be detected. When this detection method is used, erroneous judgments can be reduced, therefore, this method is particularly advantageous when the detection is performed under a condition where the current flowing through the motor 4 is small.

Further, when an elongating or shortening of judgment time whether a wire breaking exists or not is permitted depending on conditions, the following method of detection with the wire breaking detecting means 8 is also effective. Namely, the value of DC current detected in a period when a current of voltage maximum phase or of voltage minimum phase of the electric power conversion circuit is flowing in the DC current are integrated and a lapsed time until the integrated value reaches a judgment value set in advance is measured. When the measured lapsed time is longer than a judgment time value set in advance, a wire breaking of a motor winding of the concerned phase or an abnormality of any of the switching elements 9 can be detected.

As will be apparent from the above, since the wire breaking detection method according to the integration value of the DC current or the time required for the integration serves equivalently to eliminate high frequency noises, an erroneous judgment can be avoided in an application where many irregular noises are generated in the course of detecting the DC current.

Figure 4:
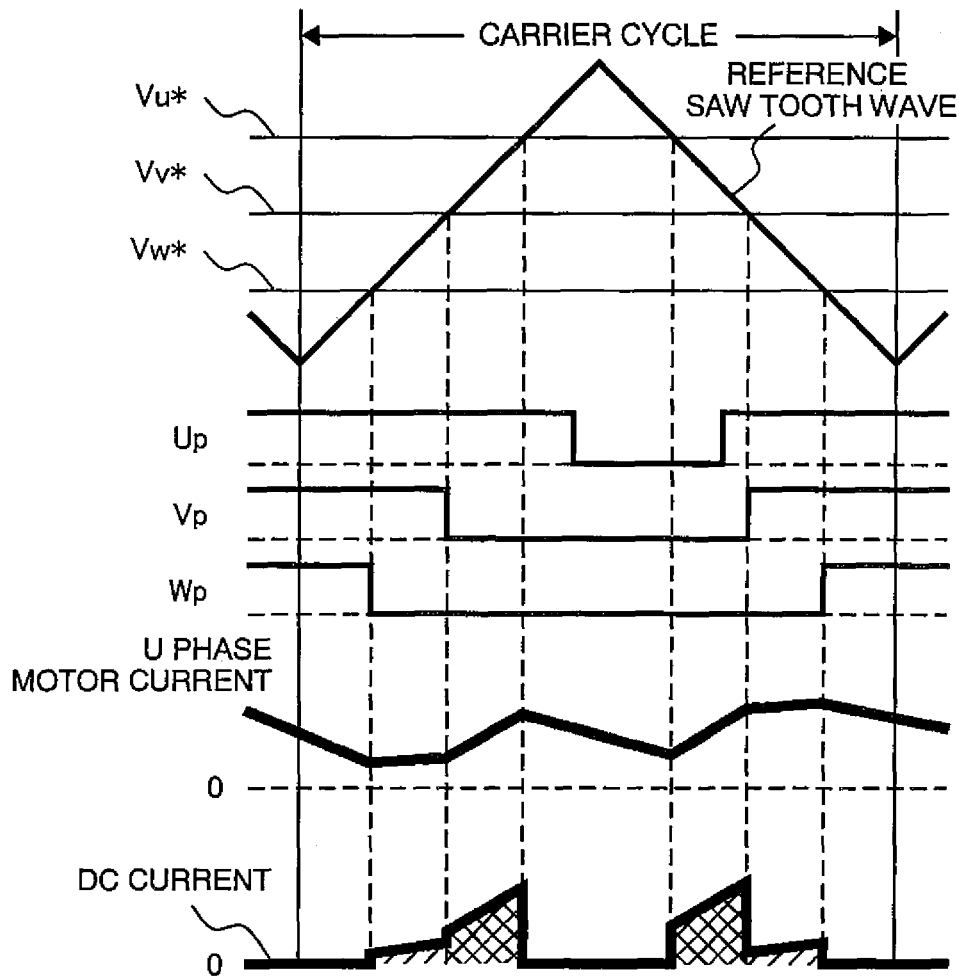
FIG. 4 is a DC current waveform diagram in a case when the rotating number of a motor is rotating at high speed and the load thereof is light in embodiment 1 of the present invention.

Now, a method of detecting a wire breaking which is particularly advantageous when the current command value is very small will be explained with reference to FIG. 4-FIG. 7. FIG. 4 shows a relationship between voltage command values of respective phases and a DC current flowing through the shunt resistor under a condition when the motor 4 is rotating at high speed and the load thereof is light. Since the motor speed is high, the q axis voltage command value Vq* becomes large due to the term relating to the induced voltage constant Ke in the equation (2). On the other hand, with regard to the current command value, the d axis current command value Id* is set as 0 and the q axis current command value Iq* is small due to the light load. For this reason the current flowing through the motor 4 becomes small. When the motor current is small, the current detection is difficult of which reason will be explained herein below.

For example, assuming that the shunt resistance value Rs is 5 mΩ, the maximum current value Imax flowing through the shunt resistor 5 is 25 A and the maximum voltage PV is 5V which can be applied to the control circuit 10, and when the DC current detection circuit 6 outputs for a current value of ±25 A as an amplified signal of from 0 to 5 v (maximum voltage PV) using ½ (=2.5V) of the maximum voltage PV as a middle point reference, the amplification gain G-op of the DC current detection circuit 6 reaches to about 20 times. Further, the amplification gain of the DC current detection circuit 6 is usually set comparatively small and a possible current detection range of the DC current detection circuit 6 is set larger than the maximum value of the current flowing through the motor 4. When assuming that the resolution D-ad of the A/D converter (not shown) in the motor current detecting means 7 is 10 bit, a resolution of current detection A-res is, for example, determined according to the following equation (3) and is given as about 50 mA/digit.

$$A\text{-}res = PV/(Rs \times G\text{-}op \times D\text{-}ad) \qquad \text{equation (3)}$$

Herein, when assuming that an error of the A/D converter (not shown) in the motor current detecting means 7 is 4 digit and an error relating to the DC current detection (an amplification error such as in a reference power source of the A/D converter and the DC current detection circuit 6) is 5%, a current detection value of less than about 230 mA is not necessarily said as correct. Therefore, when the current command value is less than about 230 mA, a possible erroneous current detection can happen due to detection error of the current detection never the less no current is flowing because of a wire breaking in a motor winding or an abnormality of any of the switching elements. As such, under a condition when a motor current value is small, a current detection is difficult. Further, this problem is not limited to the current detection method of detecting motor currents of the respective phases from the DC current flowing through the shunt resistor, but is also true to a method of detecting a wire breaking by detecting the motor currents of the respective phases with a current sensor.

However, when a motor is continuously driven under a condition of wire breaking of a motor winding, an adverse effect, for example, such as out of control of the motor is caused in the electric power conversion device even if the load is light. For this reason, even under the light load condition, in other words, even under a condition when a motor current is small, it is important to perform a wire breaking detection.

Figure 5:
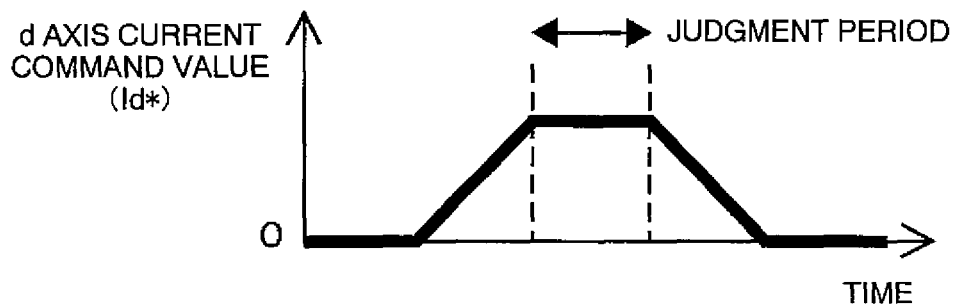
FIG. 5 is a waveform diagram showing an alternation example of d axis current command value in embodiment 1 of the present invention.

Generally, when a difference between Ld and Lq of the motor 4 is small (which is approximated to a condition with no salient pole characteristic), an effect of the d axis current for generating a motor torque is small. Therefore, the d axis current command value Id* is, for example, increased temporarily to a predetermined value set in advance as shown in FIG. 5 and in a period where the d axis current command value Id* is not zero, a wire breaking detection is performed by making use of the motor current detection value at this moment. Further, in FIG. 5, the d axis current command value is increased in a linear function, but can be increased stepwise. Further, the judgment period is enough if the period is more than the period that permits the current detection, namely, if the judgment period is more than the half of the PWM carrier cycle, the wire breaking detection can be performed.

Figure 6:
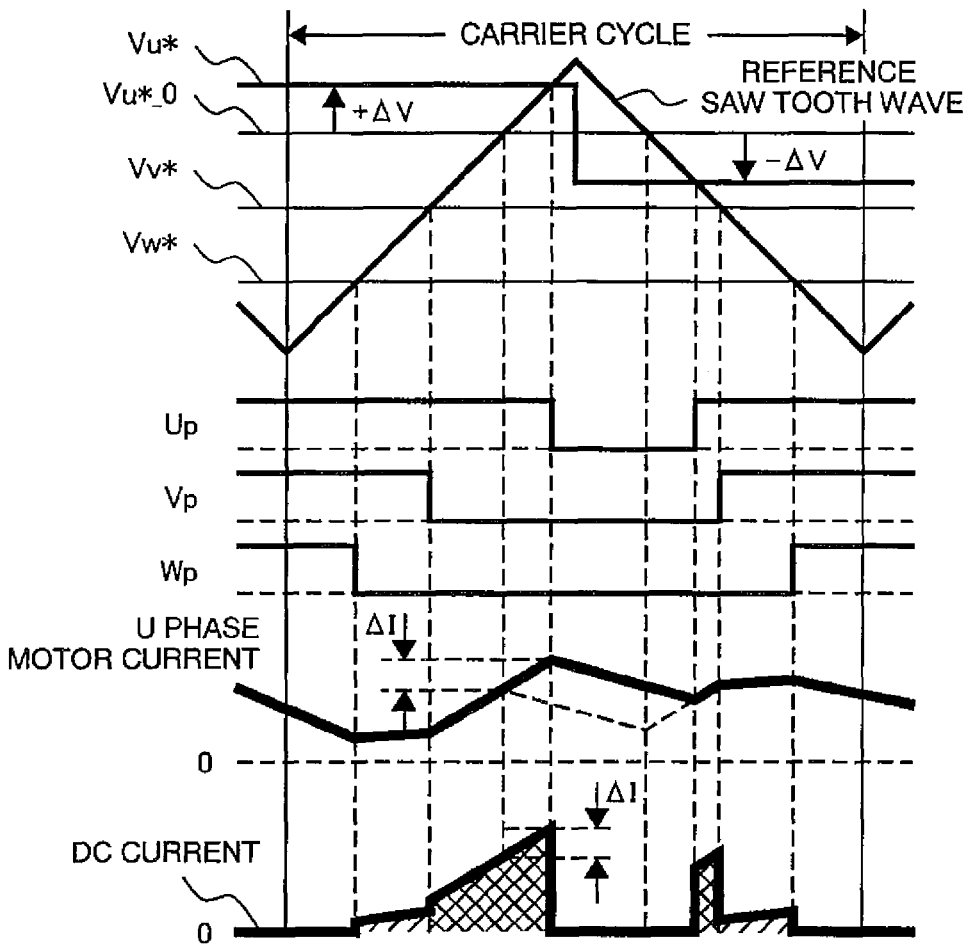
FIG. 6 is a waveform diagram showing a first example when altering a voltage command value in embodiment 1 of the present invention.

On the other, when the difference between Ld and Lq of the motor 4 cannot be neglected, namely the motor 4 possesses a salient pole characteristic, it is effective to perform the wire breaking detection with the following method. As shown in FIG. 6, the voltage command value of the voltage maximum phase (U phase in FIG. 6) is differentiated between the former half of the PWM carrier cycle and the latter half thereof. More specifically, for the former half cycle a wire breaking detection voltage command ΔV is added to the original U phase voltage command value Vu*-0 and for the latter half cycle the ΔV is subtracted from the original value. As a result, in the former half cycle, the U phase motor current increases by ΔI and a current in a U phase current detectable period (the period indicated by grid pattern in the drawing) in DC current is likely increases by ΔI. However, when there exists a wire breaking in the motor winding or an abnormality in any of the switching elements, no ΔI is generated. By making use of this, in that by comparing the DC current detection values before and after adding ΔV the wire breaking detection can be performed. Although the amount of ΔV is different depending on the inductance value of a motor, it is enough if a value is selected with which ΔI exceeds the resolution of current detection. By adding the ΔV to the U phase voltage command value Vu*-0, the U phase voltage output in the former half cycle is increased by ΔV, however, the U phase voltage outputted in the latter half cycle is decreased by ΔV, therefore, from viewpoint of one PWM carrier cycle, it is assumed a same voltage is output resultantly and no substantial influence is affected on the motor control. Further, the addition and subtraction of ΔV do not need to be performed in one PWM carrier cycle, ΔV can be subtracted over a plurality of PWM carrier half cycles as, for example, shown in FIG. 7. In addition, in FIG. 7, since ΔV is subtracted in three PWM carrier half cycles, N in the drawing gives 3. Further, since the addition timing of ΔV is not limited in particular, the following methods, for example, can be used, in that, in a former half cycle ΔV is subtracted and in the latter half cycle ΔV is added, in a first half cycle ΔV/3 is subtracted, in the second half cycle ΔV is added and in the third and fourth half cycles, ΔV/3 is respectively subtracted, and an order of addition and subtraction is altered in every time.

Figure 7:
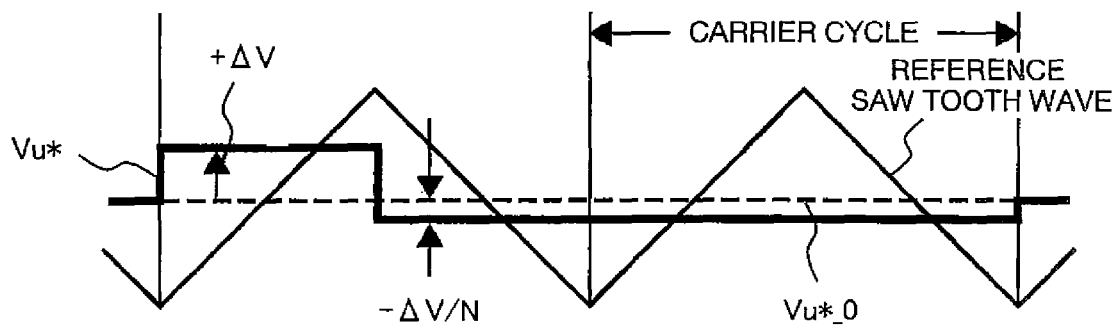
FIG. 7 is a waveform diagram showing a second example when altering a voltage command value in embodiment 1 of the present invention.

In FIGS. 6 and 7, methods of altering the voltage command value of the voltage maximum phase have been explained, however, the same method can be applicable to that of voltage minimum phase.

With the method of altering the voltage command value in the former half cycle and in the latter half cycle in the PWM carrier cycle as has been explained above, the wire breaking detection can be performed even when the current command value is small. Further, the present method is not limited to the application during operation, but can be applied to a condition when a motor is in stand still. Because of these advantages, the present method is a very advantageous wire breaking detection method that can surely perform a wire breaking detection regardless to such as an amount of current command value and driving circumstances and operating conditions of a motor as well as during the operation thereof.

Embodiment 2

Figure 8:
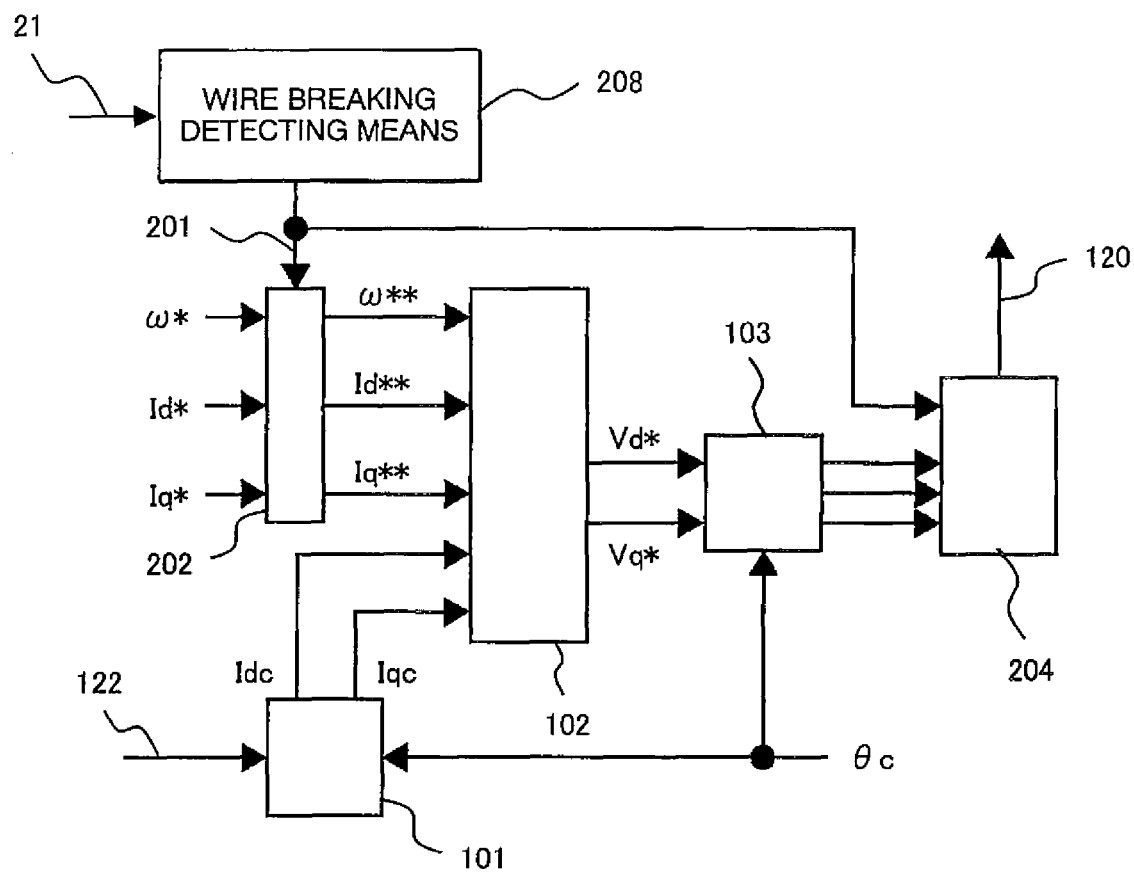
FIG. 8 is a constitutional diagram for explaining an operation after detecting a wire breaking in embodiment 2 of the present invention.

An operation after detecting a wire breaking will be explained with reference to from FIG. 8 to FIG. 10 in connection with embodiment 2 of an electric conversion device (motor drive device) according to the present invention. A wire breaking detection means 208 in the present embodiment is the same as embodiment 1 with regard to the wire breaking detection method, but different because the wire breaking detection means 208 outputs a wire breaking detection signal 201 after detecting a wire breaking. The wire breaking detection signal 201 is input to an angular frequency command adjusting means 202 (stop controlling means or deceleration and stop controlling means) as well as to a PWM pulse generation unit 204 as shown in FIG. 8. The angular frequency command adjusting means 202 decreases an angular frequency command value when the wire breaking detection signal 201 is input.

Figure 9A:
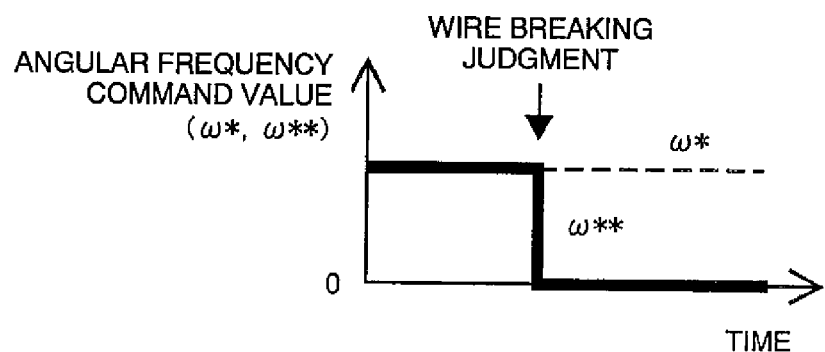
FIG. 9 is a waveform diagram for explaining an operation of a stopping control means and a deceleration and stopping control means in embodiment 2 of the present invention.

When there are no problems if a motor is suddenly stopped, as shown in FIG. 9(a), at the same time when the wire breaking detection signal 201 is input (at the very portion of wire breaking judgment in the drawing), an angular frequency command value ω output to the voltage command value preparation unit 102 is rendered zero. Further, dq axis current command values (Id and Iq**) output to the voltage command value preparation unit 102 is also rendered zero. Thereby, the voltage applying to the motor is stopped.

Figure 9B:
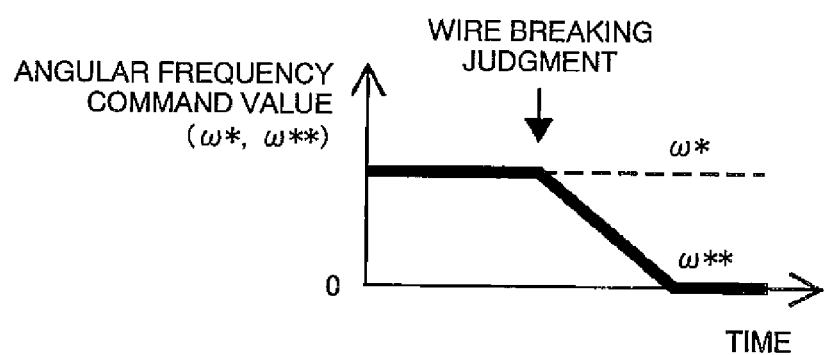
Figure 10:
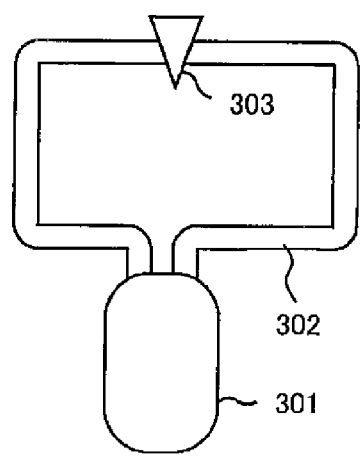
FIG. 10 is a general constitutional diagram when the present invention is applied to a fluid circulation cycle in embodiment 2 of the present invention.

On the other hand, when a motor is used as a motive power for a fluid circulation pump 303 as shown in FIG. 10, if the motor is suddenly stopped, a pressure in a part of a fluid circulation route 302 changes suddenly and possibly damages the same. In such instance, when the angular frequency command value ω** is decelerated with a predetermined deceleration rate after judging the wire breaking as shown in FIG. 9(b) and such as a valve 303 in the fluid circulation cycle is adjusted during the deceleration period, the motor can be safely stopped.

Embodiment 3

Figure 11:
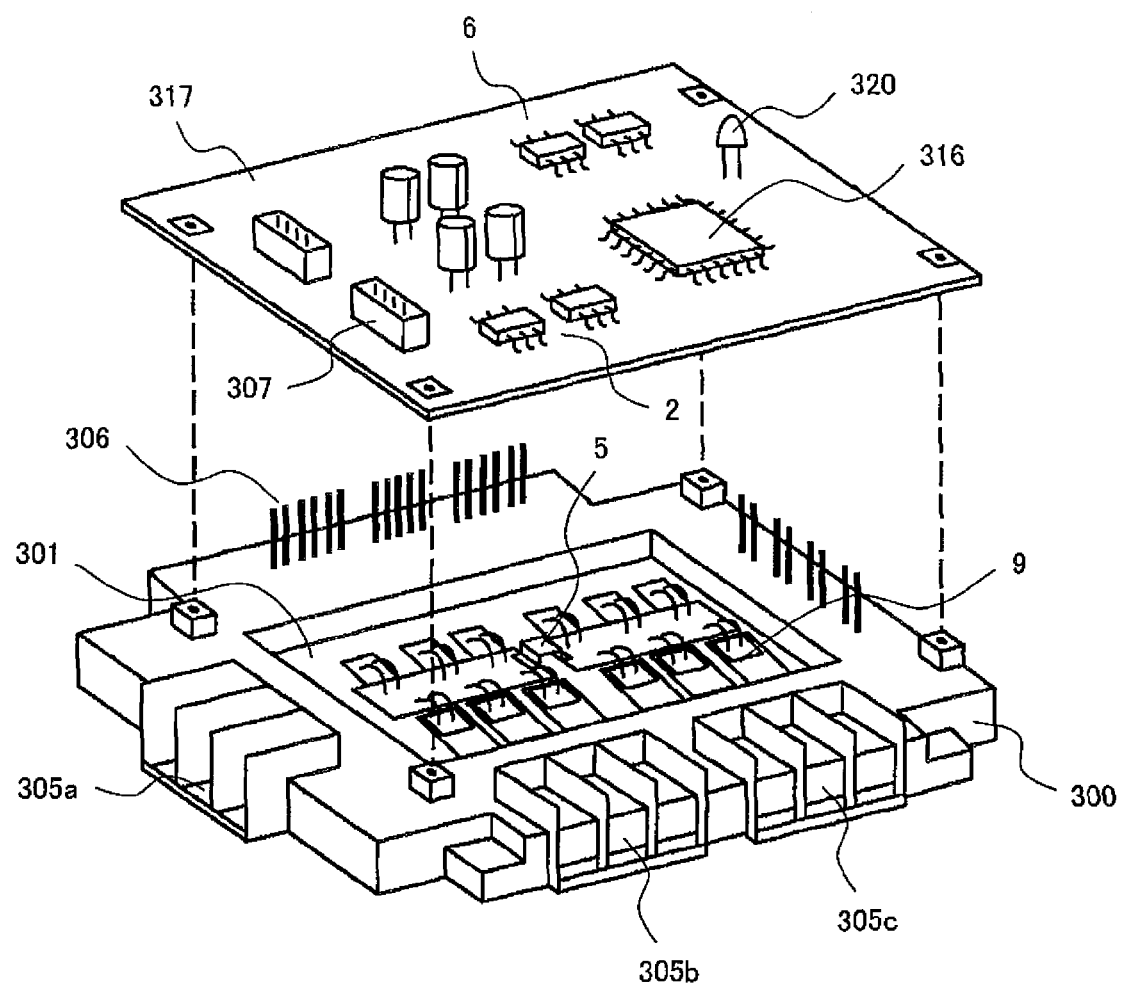
FIG. 11 is a perspective view when an electric power conversion device is formed into a single module in embodiment 3 of the present invention.

An embodiment 3 of an electric power conversion device according to the present invention will be explained with reference to FIG. 11. The electric power conversion device of the present embodiment is constituted as a module while accommodating the motor drive device 12 in the single package. The device is constituted while roughly being divided into twp parts, in that a power portion (the inverter circuit 3 and the shunt resistor 5) accommodated in a lower package 300 and a subsubstrate 317 carrying the control circuit 10, the DC current detection circuit 6 and the drive circuit 2 as shown in FIG. 11. In the drawing, although the lower package 300 and the subsubstrate 317 are illustrated separately for the sake of easy explanation, actually both are integrated. In the lower package 300, an aluminum substrate 301 is disposed on which such as the switching elements 9 and the shunt resistor 5 are mounted. The DC voltage source 11 is input from terminals 305b and an AC power is output from terminals 305c. The lower package 300 and the subsubstrate 317 are connected via terminals 306 so as to exchange information. The control circuit 10 is constituted by a microcomputer 316 and carried on the subsubstrate 317. Namely, the power system such as the switching elements 9 is arranged separately from the control system such as the microcomputer 316 so that the control system does not affected by noises generated from the power system. Thereby, an erroneous judgment of a wire breaking can be reduced. The DC current detection circuit 6 amplifies a voltage at both terminals of the shunt resistor 5 and inputs the same to the microcomputer 316. The PWM signals output from the microcomputer 316 are input to the drive circuit 2 and are amplified therein to a signal level capable of driving the switching elements 9. Further, on the subsubstrate 317, connectors 307 are mounted such as for communicating and exchange information with such as other electric power conversion devices and superior control systems.

Further, the switching elements 9 mounted on the aluminum substrate 301 are not limited to bare chips and a packaged article can be mounted. Further, through disposing such as a shield plate between the switching elements 9 in the power system and the microcomputer 316 in the control system, the microcomputer 316 in the control system can be mounted together with such as the switching elements 9 in the power system on a single aluminum substrate.

When the electric power conversion device is accommodated in a single package as shown in FIG. 11, a test of the switching elements 9 can be performed with the wire breaking detecting means 8, for example, before assembling the electric power conversion device into a product. Namely, a motor or a winding to be used for testing is connected to the terminals 305c and a current having a predetermined value is flown thereto. At this instance, an abnormality judgment in any of the switching elements 9 is performed with the wire detecting means 8. When the elements are judged as acceptable because of no abnormality, an LED on the subsubstrate 317 is lighted. When an abnormality in any of the switching elements (for example, such as a defective soldering) 9 is judged, the defective is informed to a person performing the test by flickering the LED. In this manner, when a wire breaking detection can be performed only for an electric power conversion device, an abnormality in any of the switching elements 9 before assembling the same into a product can be judged, therefore, a counter measure therefor can be taken quickly.

Embodiment 4

Figure 12:
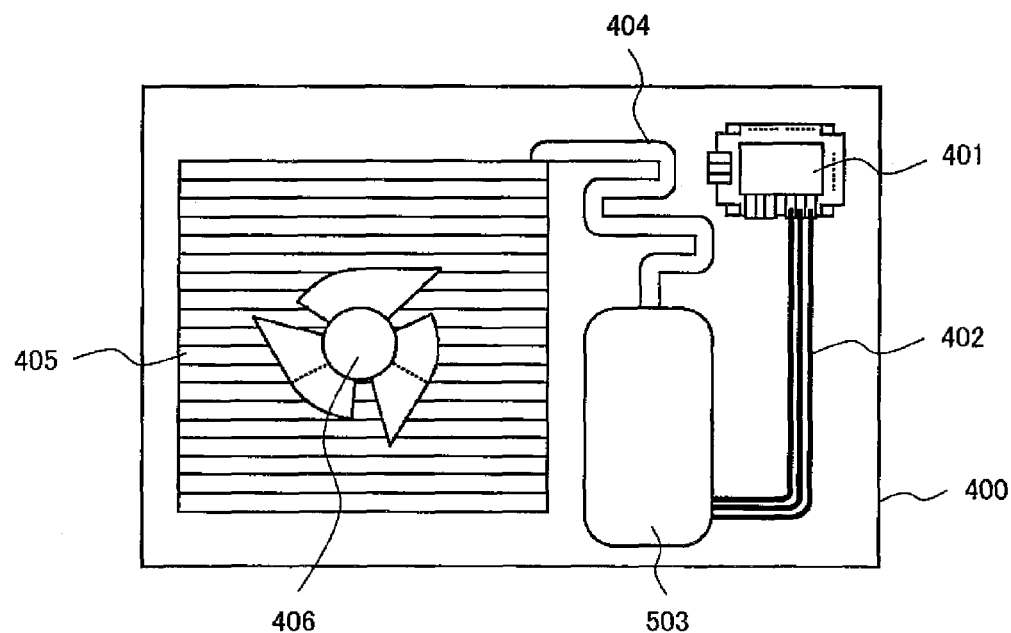
FIG. 12 is a schematic diagram when the present invention is applied to a compressor drive system for air conditioner in embodiment 4 of the present invention.

An embodiment 4 of an electric power conversion device according to the present invention will be explained with reference to FIG. 12. FIG. 12 is a schematic view of an outdoor unit for an air conditioner, when an electric power conversion device according to the present invention is applied to a compressor drive system for an air conditioner. An electric power conversion device 401 formed into a module is connected to a compressor 403 via wirings 402 and compresses coolant by driving a motor in the compressor. The coolant compressed to a high pressure is transferred through a piping 404 to a heat exchanger 405 where heat is discharged. Although not illustrated in the present drawing, there is provided an indoor unit paired with the outdoor unit 400. The pressure of the coolant is lowered in a heat exchanger for the indoor unit and the coolant absorbs heat there and returns to the compressor. Further, in connection with the cooling operation and the warming operation the coolant flows in the indoor unit and the outdoor unit are opposite and heat is discharged from the heat exchanger in the indoor unit.

By applying the electric power conversion device according to the present invention to the compressor drive system for an air conditioner, for example, even such as in a condition where a set temperature value and an actual room temperature are substantially the same and in a defrost operating condition, namely, in a condition where the load of the electric power conversion device is lightened, a wire breaking detection can be performed.

When another method of detecting a wire breaking is performed in the air conditioner cycle, the wire breaking detection in the electric power conversion device forms a dual system together with the other method and enhances safety.

Embodiment 5

Figure 13:
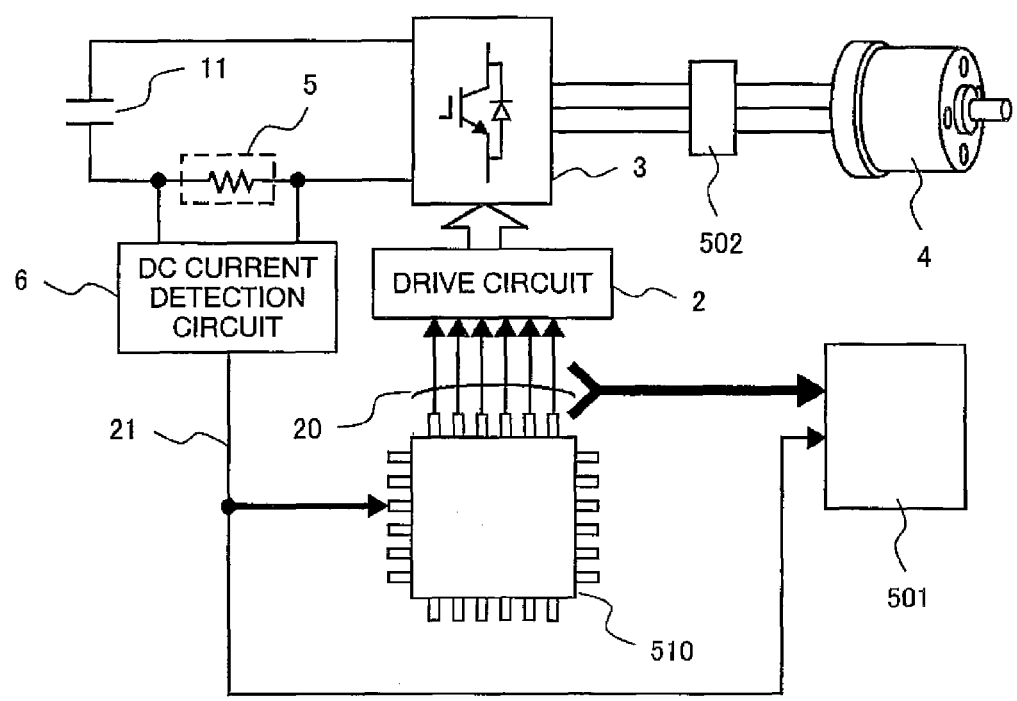
FIG. 13 is a general constitutional diagram when testing the present invention in embodiment 5 of the present invention.

The control circuit 10 according to the present invention is frequently realized by making use of a semiconductor integrated circuit such as for a microcomputer and a DSP. In such instance, there arises a drawback that verification whether the wire breaking detection means 8 is correctly realized is difficult. Therefore, in the present embodiment, an operation verifying method for confirming that a wire breaking detection means 8 according to the present invention is correctly realized will be explained with reference to FIGS. 13 and 14.

For the verification, a breaker such as a circuit breaker 502 is provided between an inverter circuit 3 and the motor 4. The circuit breaker 502 can interrupt a winding of any phase or windings of all phases among the wirings connected to the motor 5. For verifying the operation, the wiring to U phase is interrupted (any phase can be interrupted) by the circuit breaker 502 when the motor 4 is driving, and the PWM signals 20 output from the microcomputer 510 (corresponding to the control circuit 10) and the values 21 of DC current detected from the shunt resistor 5 before and after the interruption are observed by a measurement unit 501. Further, since the inverter circuit 3 outputs an AC voltage, a relationship between a voltage maximum phase, a voltage intermediate phase and a voltage minimum phase in the electric power conversion circuit varies according to time. For this reason, all of the PWM signals 20 are not necessarily observed at the same time. Because of limitation of the measurement unit 501, when it is difficult to observe all of the PWM signals 20 at the same time, there arises no problem if any one of waveforms is observed.

Figure 14:
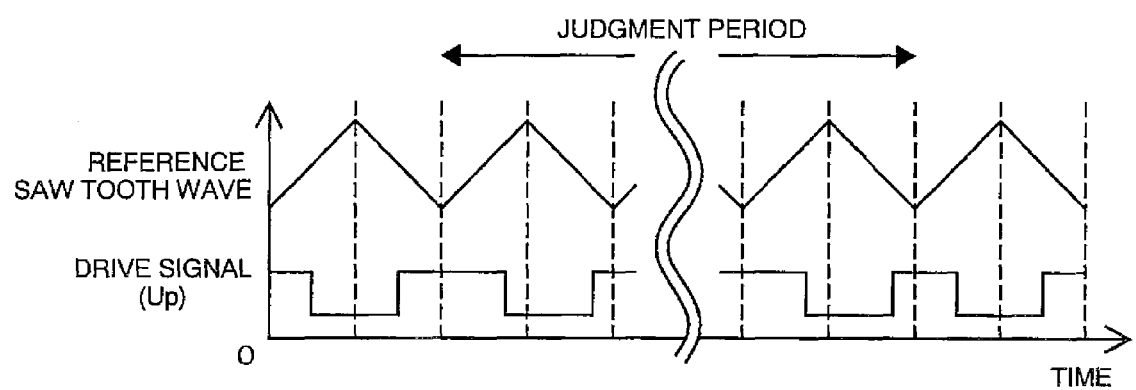
FIG. 14 is a waveform diagram showing a first example of PMW signal confirming wave in embodiment 5 of the present invention.

FIG. 14 shows a PWM signal of U phase after interruption. In a wire breaking judgment period, when compared with that of PWM signal outside the judgment period, when on period of the upper arm in U phase is prolonged in the rising section of the PWM carrier signal and oppositely, the on period of the upper arm in U phase in the falling section is shortened, it is confirmed that the wire breaking detection suitable for a motor having salient pole characteristic as explained in connection with the embodiment 1 is correctly performed. Further, since the judgment with the wire breaking detection according to the present invention is possible even in the period when U phase voltage is the maximum voltage phase or the minimum voltage phase, the judgment period is given 120 in electrical degree, when the cycle of an AC voltage applied to a motor is constant.

Figure 15:
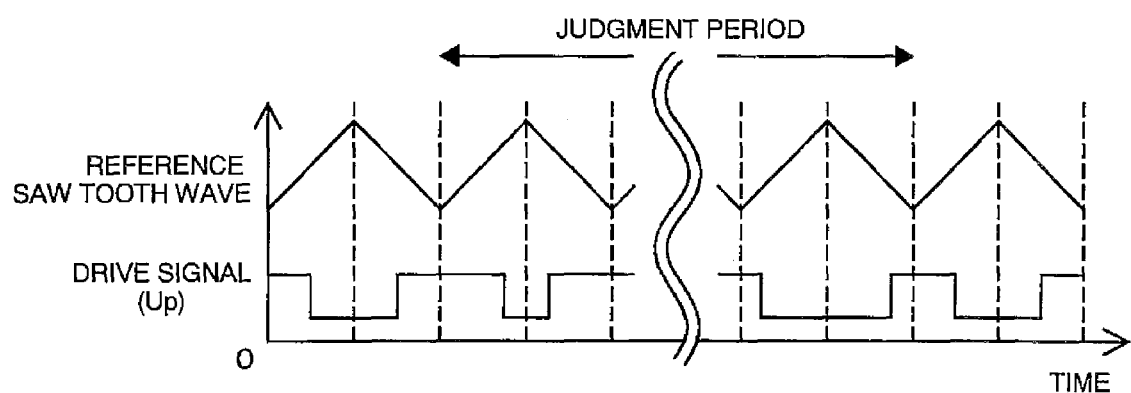
FIG. 15 is a waveform diagram showing a second example of PMW signal confirming wave in embodiment 5 of the present invention.
Figure 16:
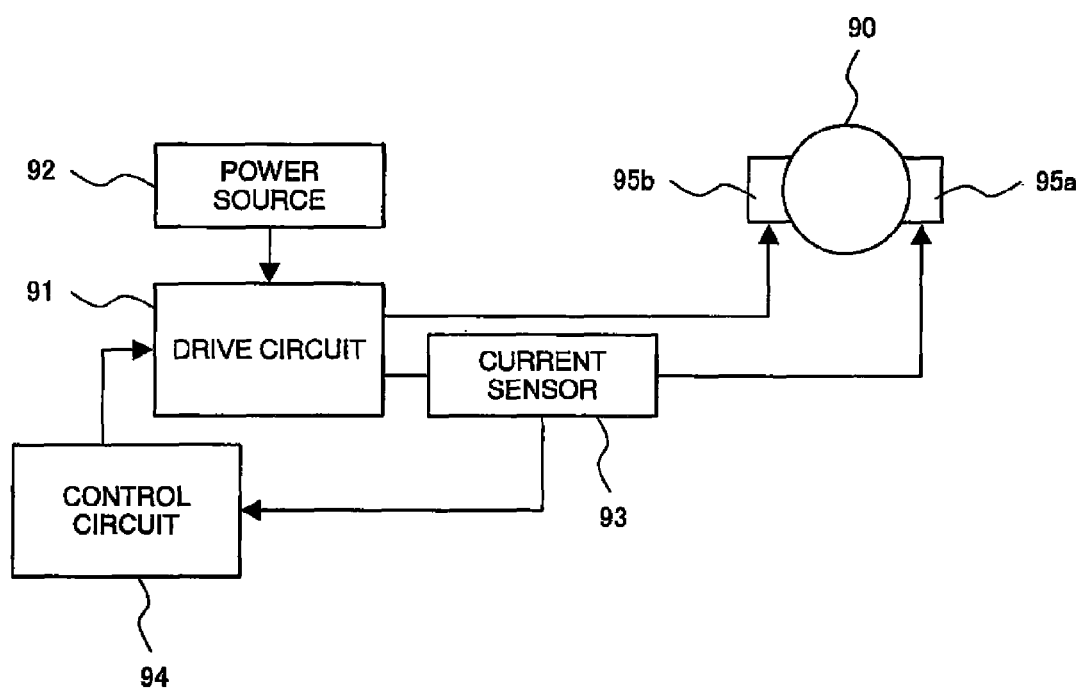
FIG. 16 is a general constitutional diagram of patent document 1.
Figure 17A:
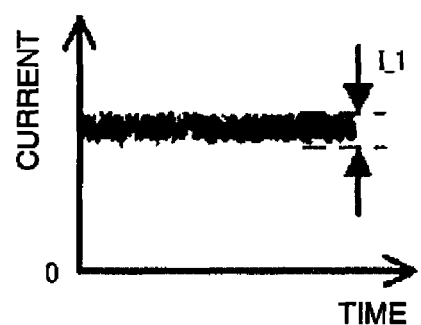
FIG. 17 is motor current waveforms in patent document 1.
Figure 17B:
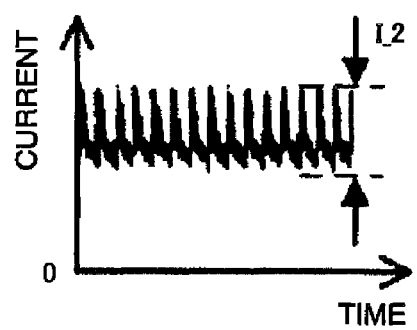
Figure 18A:
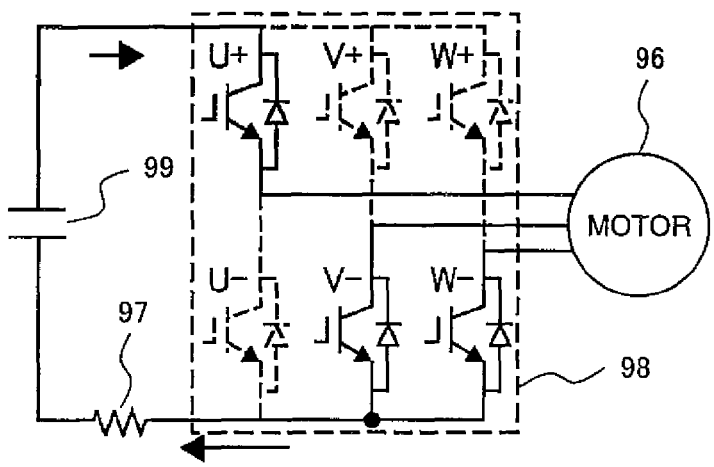
FIG. 18 is current route diagrams in patent document 2.
Figure 18B:
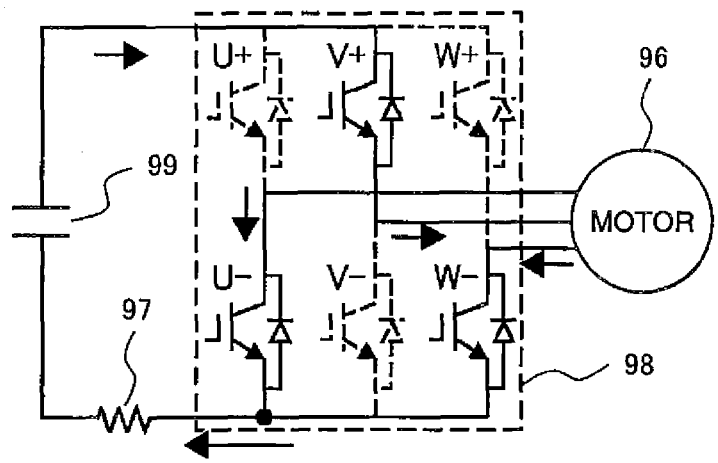
Figure 18C:
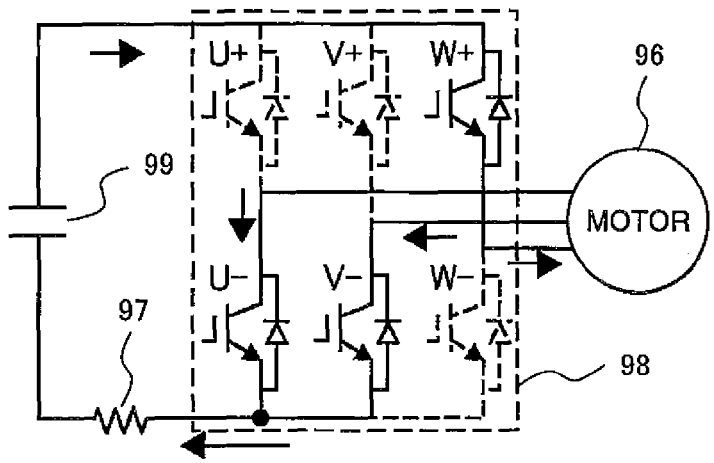

Now, a verification method in a case of a motor approximated as having no salient pole characteristic will be explained. In this instance, when observing the phase currents of the motor, the verification can be performed further easily. FIG. 15 shows a current waveform of a three phase motor before and after windings of all phases are interrupted by the circuit breaker 502. When the motor is driven with no load, q axis current command value assumes zero. For this reason, on and off rates of the PWM signal 20 are given respectively almost 50%. However, due to such as dead time compensation, there is a case where one of the rates is larger a little than the other. In such instance, when the d axis current command value is increased as shown in FIG. 5 for the wire breaking detection, an amplitude of the three phase voltage command value is increased. Accordingly, the on and off rates are increased or decreased in 360° in electric angle. By checking the waveform in this manner, it is confirmed whether the wire breaking detection method according to the present invention is realized correctly.

Hitherto, although the invention made by the present inventors has been specifically explained based on the embodiments, the present invention is not limited to the embodiments and can be modified in a variety of manners in a scope without departing from the gist thereof.

INDUSTRIAL APPLICABILITY

The present invention relates to an electric power conversion device provided with an electric power conversion circuit controlled by pulse width modulation signals (PWM signals) and is particularly effective when the same is applied to a wire breaking detection method of a load connected at an output side of the electric power conversion circuit.

What is claimed is:
1. An electric power conversion device comprising:
an electric power conversion circuit including switching elements for converting a DC electric power to an AC electric power,
a load connected to an output side of the electric power conversion circuit,
a DC current detecting means for detecting a current flowing through a DC side in the electric power conversion circuit, and
a control circuit for controlling the switching elements in the electric power conversion circuit,
characterized by further comprising a wire breaking detecting means that judges a wire breaking in the load or an abnormality of any of the switching elements in the electric power conversion circuit by making use of a value of DC current detected by the DC current detecting means during a time when a first current flows in a voltage maximum phase, which has the longest turn-on term in a duty cycle for upper arm switching elements of the electric power conversion circuit, which first current flows through the DC side in the electric power conversion circuit, or during a time when a second current flows in a voltage minimum phase, which has the shortest turn-on term in the duty cycle for the upper arm switch- ing elements, which second current flows through the DC side in the electric power conversion circuit.

2. The electric power conversion device according to claim 1 characterized in that the wire breaking detecting means judges the wire breaking in the load or the abnormality of any of the switching elements in the electric power conversion circuit by making use of an integration value of the DC current detection value.

3. The electric power conversion device according to claim 1 characterized by further comprising an abnormality informing means for informing outside when the wire breaking detecting means judges the wire breaking in the load or the abnormality of any of the switching elements in the electric power conversion circuit.

4. The electric power conversion device according to claim 1 characterized by further comprising a stopping control means for stopping a voltage applying to a motor load being driven or a decelerating and stopping control means for stopping the motor after deceleration when the wire breaking in the load or the abnormality of any of the switching elements in the electric power conversion circuit is judged.

5. The electric power conversion device according to claim 1 characterized by being accommodated into a single package.

6. An electric power conversion device comprising:
an electric power conversion circuit including switching elements for converting a DC electric power to an AC electric power,
a load connected to an output side of the electric power conversion circuit,
a DC current detecting means for detecting a current flowing through a DC side in the electric power conversion circuit, and
a control circuit for controlling the switching elements in the electric power conversion circuit,
characterized in that the control circuit includes a voltage command value preparing means for outputting a voltage command value, the voltage command value preparing means alters the voltage command value in an integral multiple cycle of ½ of a cycle for controlling the switching elements in the electric power conversion circuit, and
characterized by further comprising a wire breaking detecting means that judges a wire breaking in the load or an abnormality of any of the switching elements in the electric power conversion circuit by making use of a value of DC current detected by the DC current detecting means, at the time when the voltage command value preparing means alters the voltage command value, in a period when a current of voltage maximum phase or of voltage minimum phase of the electric power conversion circuit is flowing in a DC current.

7. The electric power conversion device according to claim 6 characterized in that the voltage command value preparing means alters a d axis current command value when preparing the voltage command value, the wire breaking detecting means judges the wire breaking in the load or the abnormality of any of the switching elements in the electric power conversion circuit by making use of a value of DC current detected by the DC current detecting means, at the time when the voltage command value preparing means alters the d axis current command value, in the period when the current of voltage maximum phase or of voltage minimum phase of the electric power conversion circuit is flowing in the DC current.

8. The electric power conversion device according to claim 6 characterized in that the wire breaking detecting means judges the wire breaking in the load or the abnormality of any of the switching elements in the electric power conversion circuit by making use of a difference of values of DC current detected by the DC current detecting means before and after the voltage command value being altered by the voltage command value preparing means in a period when the current of voltage maximum phase or of voltage minimum phase of the electric power conversion circuit is flowing in the DC current.

9. The electric power conversion device according to claim 6 characterized in that the wire breaking detecting means judges the wire breaking in the load or the abnormality of any of the switching elements in the electric power conversion circuit by making use of an integration value of the values of DC current detected by the DC current detecting means in the period when the current of voltage maximum phase or of voltage minimum phase of the electric power conversion circuit is flowing in the DC current.

10. The electric power conversion device according to claim 6 characterized by further comprising an abnormality informing means for informing outside when the wire breaking detecting means judges the wire breaking in the load or the abnormality of any of the switching elements in the electric power conversion circuit.

11. The electric power conversion device according to claim 6 characterized by further comprising a stopping control means for stopping a voltage applying to a motor load being driven or a decelerating and stopping control means for stopping the motor after deceleration when the wire breaking in the load or the abnormality of any of the switching elements in the electric power conversion circuit is judged.

12. A compressor motor using an electric power conversion device, wherein the electric power conversion device comprising:
an electric power conversion circuit including switching elements for converting a DC electric power to an AC electric power,
a load connected to an output side of the electric power conversion circuit,
a DC current detecting means for detecting a current flowing through a DC side in the electric power conversion circuit,
a control circuit for controlling the switching elements in the electric power conversion circuit, and
a wire breaking detecting means that judges a wire breaking in the load or an abnormality of any of the switching elements in the electric power conversion circuit by making use of a value of DC current detected by the DC current detecting means during a first time when a first current flows in a voltage maximum phase, which has the longest turn-on term in a duty cycle for upper arm switching elements of the electric power conversion circuit, which first current flows through the DC side in the electric power conversion circuit, or during a time when a second current flows in a voltage minimum phase, which has the shortest turn-on in the duty cycle for upper arm switching elements, which second current flows through the DC side in the electric power conversion circuit.

13. An air conditioner characterized by being provided with the compressor motor according to claim 12.

* * * * *